July 23, 1957     R. J. LA ROSE ET AL     2,799,984
METHOD FOR MECHANICALLY HANDLING SUGAR CANE
STALKS DURING HARVESTING
Original Filed Nov. 23, 1954

Inventors
Royal J. La Rose
Edward Clause

By *Darney & Darney*
ATTYS

United States Patent Office 2,799,984
Patented July 23, 1957

2,799,984

METHOD FOR MECHANICALLY HANDLING SUGAR CANE STALKS DURING HARVESTING

Royal J. La Rose, Thibodaux, and Edward P. Clause, Lababieville, La.

Original application November 23, 1954, Serial No. 470,642. Divided and this application August 20, 1956, Serial No. 604,864

2 Claims. (Cl. 56—51)

This invention is a method to facilitate harvesting of sugar cane being a division of our copending application, Serial Number 470,642 filed November 23, 1954.

In the use of cane harvesters designed for "heaping" the sugar cane at right angles to, and across the rows, it is conventional procedure upon entering a cane field, to initially cut an intermediate row of cane. The cut stalks fall to a leaning position against an adjacent standing row of sugar cane. The rows of standing cane adjacent the cut row, but in a direction opposite to the lean are then successively cut and "heaped" in a row adjacent the leaning stalks. In order to permit passage of the harvester to cut the remaining standing row, which supports the leaning row, it has heretofore been necessary to first manually turn the cut stalks over onto the heap row. This manual phase of the harvesting operation, is time-consuming and costly.

It is an object of this invention to provide a method for mechanically removing from the sugar cane harvester's path, cane stalks previously cut by the harvester and leaning against a standing row of cane.

Another object of the invention is to provide a method of harvesting sugar cane by which an entire cane field may be cut and piled without manual handling of the cane during any phase of the operation.

A further object of this invention is to provide a method for progressively lifting leaning cane stalks and turning them over out of the path of the advancing harvester machine.

It is also within the contemplation of this invention to provide a method which may also be used in raising uncut cane stalks which have been "beaten down" by the elements, and retaining the stalks in a standing vertical position until the cutters of a harvester have impinged the raised stalks.

Figure 1:
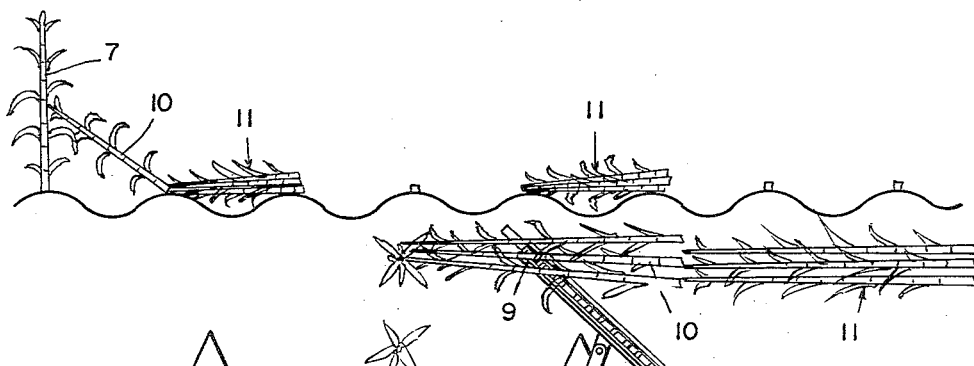
Figure 2:
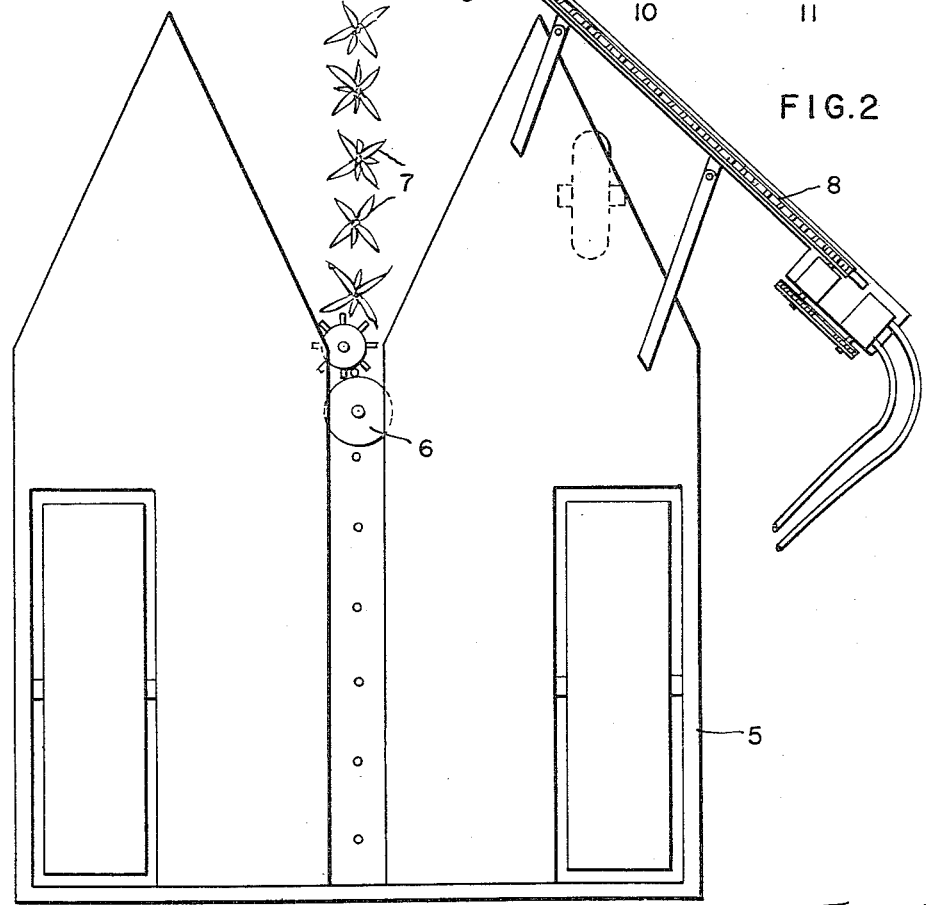

Other objects of the invention will be manifest from the following description of the present preferred form of the invention, taken in connection with the accompanying drawings, wherein:

Fig. 1 is an elevational view of a sugar cane field showing a standing row of stalks with the cut stalks of an adjacent row leaning thereagainst, and multiple heap rows; and Fig. 2 is a plan view of a sugar cane harvester and turner, illustrating the application of the invention.

For the purpose of illustrating the application of the invention, in Fig. 2 there is shown a conventional type of sugar cane harvester 5 including a cutter 6 positioned aft of a standing row of sugar cane 7. The harvester is equipped on one side of its forward end with a sugar cane turning assembly 8, the forward and lower end 9 of which is illustrated as extending beneath a plurality of leaning cut sugar cane stalks 10, the upper ends of the stalks impinging the standing row of uncut stalks 7 as shown in Fig. 1. The turner 8 illustrated, described and claimed in our companion application, includes a movable belt with kickers which progressively raise the leaning stalks 10 and throw them laterally in a direction away from the standing stalk row 7.

In operation, the harvester enters the cane field with the turner assembly in an inoperative position. An intermediate row of cane is cut by the harvester and allowed to fall in a leaning position, supported by an adjacent standing row of cane as shown to advantage in Fig. 1. Rows of standing cane in a direction opposite to the lean of the cut row are successively cut and piled in heap rows, as indicated at 11, in a well known manner, one of said heap rows being adjacent the leaning row. The turner assembly is then swung into operative position and the harvester directed toward the remaining standing row after the fashion show in Fig. 2. Since the lower forward end of the turner assembly is in advance of the harvester 5, it will make initial contact with the leaning row of cane. The kickers of the turner assembly engage successive cane stalks from underneath and gradually lifts the stalks to a vertical position where they fall away from the conveyor assembly and gravitate onto the adjacent heap row. Simultaneously with the operation of the turner assembly, the cutter 6 of the harvester is cutting the stalks 7 of the standing row. Thus the turning and cutting of the two rows is effected with one pass through the cane field.

When the method is used to straighten up the so-called "beaten down" stalks, the position of the turner assembly on the harvester is changed so that the turner assembly 8 initially contacts a row of "beaten down" cane stalks which are progressively raised to a vertical position by the turner, to place the stalks in the path of the cutter harvester 6, which latter immediately cuts the raised stalks.

While we have herein shown and described a preferred form of our invention, it is nevertheless to be understood that various changes may be made therein, without departing from the spirit and scope of the claims hereto appended.

What we claim is:

1. A method of harvesting sugar cane comprising cutting an intermediate row of standing cane and permitting it to fall into a leaning position, supported by an adjacent row, after which rows of standing cane, in a direction opposite to the lean of the cut row, are successively cut and piled in a heap in one row, followed by mechanically raising the leaning cane row and gradually lifting and turning the cane of said row to a position where it will gravitate onto the heap row.

2. The method of claim 1 including the further step of cutting the said adjacent row of cane after the leaning row has been disengaged therefrom.

References Cited in the file of this patent

UNITED STATES PATENTS

| | | |
|---|---|---|
| 1,392,258 | Mayer | Sept. 27, 1921 |
| 1,546,550 | Patten et al. | July 21, 1925 |
| 2,240,168 | Adkisson | Apr. 29, 1941 |
| 2,592,270 | Getz | Apr. 8, 1952 |
| 2,685,773 | Dauenhauer | Aug. 10, 1954 |
| 2,699,030 | Adamson | Jan. 11, 1955 |